US007362760B2

(12) United States Patent
Wang

(10) Patent No.: US 7,362,760 B2
(45) Date of Patent: Apr. 22, 2008

(54) METHOD FOR PROVIDING AN INTERNAL SERVER WITH REDUCED IP ADDRESSES

(75) Inventor: Ning Wang, Shenzhen (CN)

(73) Assignee: Huawei Technologies Co., Ltd. (CN)

( * ) Notice: Subject to any disclaimer, the term of this patent is extended or adjusted under 35 U.S.C. 154(b) by 922 days.

(21) Appl. No.: 10/420,208

(22) Filed: Apr. 22, 2003

(65) Prior Publication Data

US 2003/0214959 A1 Nov. 20, 2003

(30) Foreign Application Priority Data

May 15, 2002 (CN) .............................. 02 1 16797

(51) Int. Cl.
*H04L 12/56* (2006.01)
*H04J 3/24* (2006.01)
(52) U.S. Cl. .................. 370/392; 370/356; 370/475; 709/238
(58) Field of Classification Search ................ 370/245, 370/292, 341, 353, 354, 355, 356, 389, 392, 370/401, 402, 474, 475, 476; 709/206, 238, 709/245, 249
See application file for complete search history.

(56) References Cited

U.S. PATENT DOCUMENTS

| 6,457,061 | B1 * | 9/2002 | Bal et al. ..................... 709/245 |
| 6,567,405 | B1 * | 5/2003 | Borella et al. .............. 370/389 |
| 6,697,354 | B1 * | 2/2004 | Borella et al. .............. 370/352 |
| 2003/0088787 | A1 * | 5/2003 | Egevang ..................... 713/201 |
| 2004/0252683 | A1 * | 12/2004 | Kennedy et al. ............ 370/389 |

OTHER PUBLICATIONS

Eun-Sang Lee, Hyun-Seok Chae, Byoung-Soo Park and Myung-Ryul Choi, An Expanded NAT with Server Connection Ability, Jun. 1999, 1999 IEEE TENCON, vol. 2, 1391-1394.*
P. Srisuresh et al., "IP Network Address Translator (NAT) Terminology and Considerations Status of this Memo," Network Working Group and IETF—Internet Engineering Task Force, printout from website http://www.ietf.org/rfc/rfc2663.txt, ©The Internet Society, Aug. 1999, pp. 1-30.
Eun-Sang Lee et al., "An Expanded NAT with Server Connection Ability," ©IEEE Tencon, Sep. 1999, pp. 1391-1394.
P. Srisuresh et al., "Traditional IP Network Address Translator (Traditional NAT)", Network Working Group and IETF—Internet Engineering Task Force, printout from website http://kaizi.viagente.qc.ca/ietf/rfc/rfc/3022.txt, ©The Internet Society , Jan. 2001, pp. 1-16.

* cited by examiner

*Primary Examiner*—Afsar Qureshi
(74) *Attorney, Agent, or Firm*—DLA Piper US LLP

(57) ABSTRACT

The present invention relates to a method for providing internal server with reduced IP addresses, comprising: first, configure the corresponding relationship information between external address as well as other characteristic information and internal address as well as other characteristic information in the internal server; then, match the relevant information carried by the input messages received by the internal network and the output messages from the internal network with the configured corresponding relationship information respectively; finally, process the message according to the matching result. According to the present invention, WEB server and FTP server in the LAN can be easily provided without occupying too much valid IP addresses, thus, the present invention saves limited public IP addresses resource. Furthermore, the present invention implements port-level support to the internal server, and guarantees the security of network equipments.

4 Claims, 2 Drawing Sheets

METHOD FOR PROVIDING AN INTERNAL SERVER WITH REDUCED IP ADDRESSES

FIELD OF THE INVENTION

The present invention relates to a network communication technology, particularly to a method for providing an internal server with reduced IP addresses.

BACKGROUND OF THE INVENTION

The Net Address Translation (NAT) technology provides a method of accessing Internet with hosts in a Local Area Network (LAN), and the method solves the problem of insufficient IP addresses. Furthermore, the internal hosts in the LAN are invisible to Internet, i.e., hosts in Internet can't proactively access internal hosts in the LAN. For example, there is a host with an IP address 10.110.0.0/24 in an internal LAN and the LAN is connected to Internet via a private line and has a valid public IP address 202.38.160.1 applied through Internet Service Provider (ISP), at this time, all hosts in the LAN can share the IP address 202.38.160.1 to access Internet through NAT technology. However, hosts on Internet are unable to proactively access any internal host in the LAN.

With the development of network technologies, many organizations begin to use private addresses to establish internal LANs. Furthermore, However, some internal hosts in such a LAN are required to store resources and can be accessed by users on Internet, for example, the LAN provides WEB server, in this case, users on Internet can access the hosts providing WEB server in the LAN. Currently, in order to enable users on Internet can access the hosts in the LAN, a typical technology is to configure a "static mapping". For example, a WEB server with an internal address 10.110.0.1 is to be deployed in the LAN, a "static mapping" has to be configured to bind the valid IP address 202.38.160.1 provided through ISP to the IP address 10.110.0.1. Thus, if a host on Internet tries to access the WEB server, it can access the host with internal IP address 10.110.0.1 through accessing the IP address 202.38.160.1. Said method satisfies the requirement for providing an internal server in the LAN, and at the same time, other hosts in the LAN can't access Internet with the valid IP address, which results in waste of the valid public IP address, furthermore, and the LAN can not provide other exterior services (such as Domain Name Server (DNS) or File Transfer Protocol (FTP) server).

Seen from said traditional technology, the method for providing internal server with the static binding address has the following disadvantages:

First, though the method of static binding IP address enables hosts on Internet to access the internal server in the LAN, IP addresses can't be fully used, which results in a waste of limited IP addresses resource.

Second, said scheme has a potential safety hazard: usually the server providing exterior services is for single-use, for example, a WEB server is just used to deliver Hypertext Transfer Protocol (HTTP) service to the external world and the host is only needed to provide the access to port 80. However, if a WEB server is provided in the static binding method, users in external networks can access not only port 80, but also any other port. For example, some server can be maintained through Telnet, such a maintenance can be done only in internal network equipments, however, if static binding address translation method is used, hosts on external networks or Internet can also access the server through Telnet, which brings potential safety hazard for the internal server.

Third, according to traditional technology, internal services can not be provided through non-standard ports of the internal server, for example, if 2 WEB servers should be provided in the LAN and one of them has to use port 8080 instead of port 80, which can not be realized according to traditional technology.

SUMMARY OF THE INVENTION

Object of the present invention is to provide a method for providing internal server with reduced IP addresses, to enable to save IP addresses and guarantee security of the internal server while the internal LAN provides an internal server.

The method for providing internal server with reduced IP addresses in the present invention comprises:

(1) configuring corresponding relationship information between an external address, an external port, and an external protocol code of the internal server, and an internal address, an internal port, and an internal protocol code of the internal server;

(2) matching the relevant information carried by the message exchanged between the internal network and Internet with the configured corresponding relationship information;

(3) processing the message according to the matching result.

The message to be exchanged between the internal network and the Internet enters the external Internet after being processed by a Net Address Translation (NAT) Router.

Said step (2) further comprises:

(41) determining whether the message through the Net Address Translation (NAT) Router is an input (download) message from outside or an output (upload) message to outside;

(42) if the message is the input message, matching a destination address, a destination port, and a protocol code carried by the message with the external address, the external port, and the external protocol code configured; and

(43) if the message is the output message, matching a source address, a source port, and a source protocol code with the internal address, the internal port, and the internal protocol code configured.

For the input message, said step (3) further comprises:

(51) determining whether there is a matched item in the corresponding relationship information of the internal server;

(52) if yes, replacing the destination address and the destination port in the message with the internal address and the internal port corresponding to the external address and the external port matching with the relevant information of the input message;

(53) if no, no procession will be done to the input message.

For the output message, said step (3) further comprises:

(61) determining whether there is a matched item in the corresponding relationship information of the internal server;

(62) if yes, replacing the source address and the source port in the message with the external address and the external port corresponding to the internal address and the internal port matching with the relevant information of the output message;

(63) if no, no procession will be done to the output message.

Seen from said scheme of the present invention, WEB server and FTP server in the LAN can be easily provided without occupying too much valid IP addresses. For example, the WEB server and the FTP server in the LAN are not in the same host and they have different internal private IP addresses, but they can still provide services for the external network via a valid public IP address. The present invention saves limited and valid IP addresses resource and solves the problem of waste of valid public IP addresses resulted from the traditional scheme—providing a static address mapping for each internal server. In addition, the scheme of the present invention implements port-level support to the internal server, enabling users to configure the internal server to provide for external ports and protocols according to their own requirements, for example, through configuring a WEB server, users in external networks can access the WEB server with an internal IP address 10.110.10.10 via the address http://202.110.10.10: 8080, i.e., port 8080 of the internal server.

DETAILED DESCRIPTION OF THE EMBODIMENT

Figure 1:
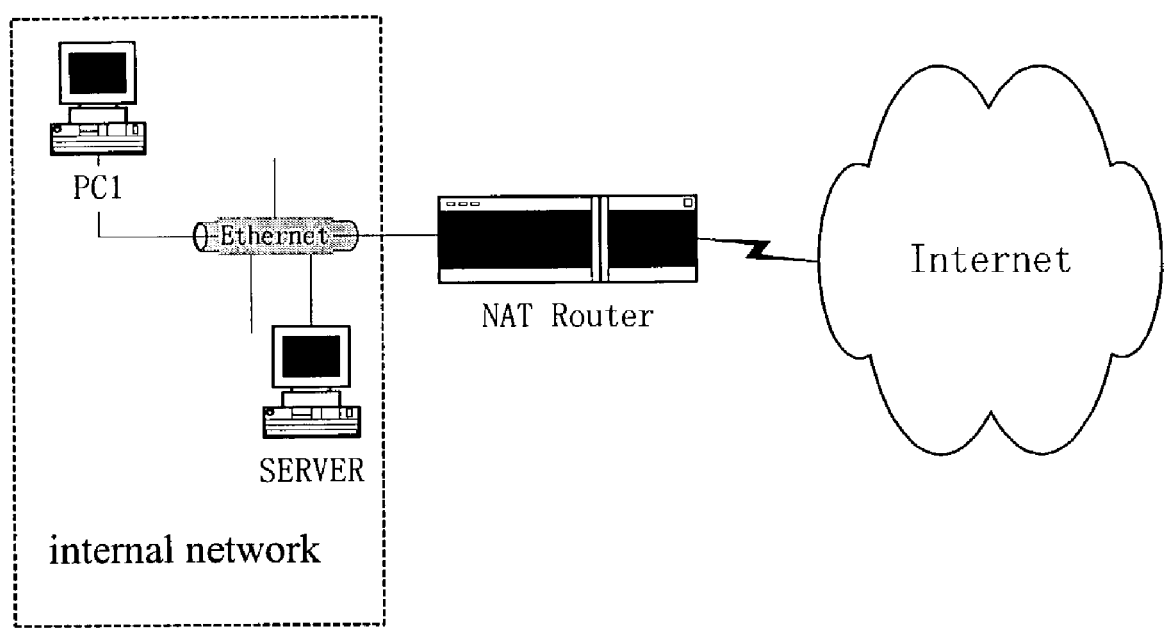
FIG. 1 is an application environment of the present invention.

The application environment is shown in FIG. 1, in which the internal network access Internet via a NAT Router. The internal network includes an internal host PC1 and an internal server SERVER connected through Ethernet. The internal network acquires a valid public IP address from an ISP, and hosts in the internal network can share the public IP address to access Internet. At the same time, according to the present invention, internal server in the internal network can provide exterior services, i.e., external hosts can access the internal server providing exterior services via the valid public IP address. In addition, in order to guarantee the security of the internal server, according to the present invention, external hosts access the ports of the internal server through a designated port, i.e., the internal servers can be configured to provide external services through a specific port.

Figure 2:
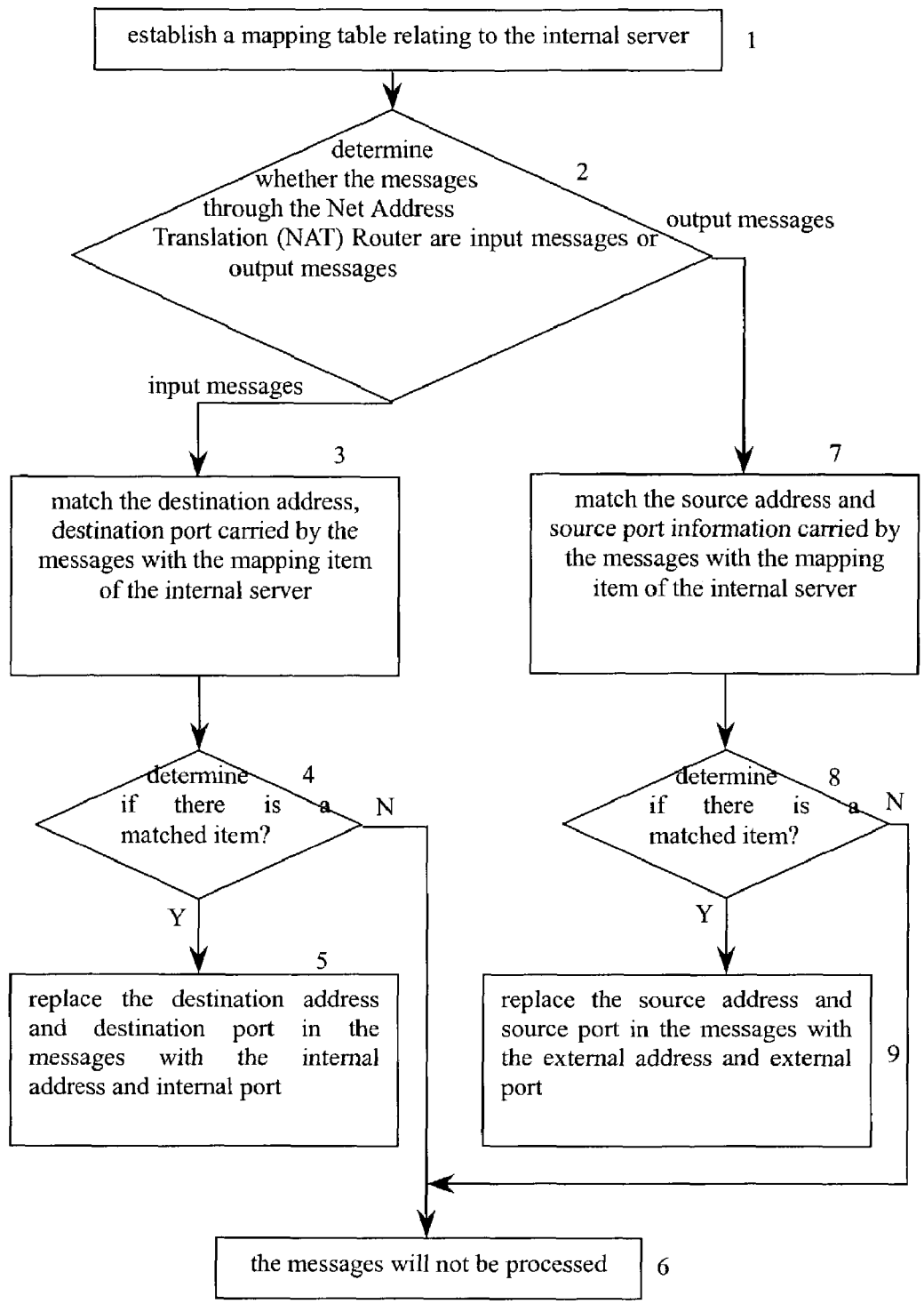
FIG. 2 is the flow chart of the detailed scheme of the present invention.

Referring to FIG. 2, the detailed embodiments of the method for providing internal server with reduced IP addresses according to the present invention is described as the following:

first, the user should configure the external address, external port, and external protocol code of an internal server as well as the internal address, internal port, and internal protocol code of the internal server on the NAT Router, and should establish a mapping table relating to the internal server according to the configured parameter, referring to step 1, to enable external hosts to access the internal server through the valid public IP address of the internal network and the port providing exterior services of the internal server.

Then, match the relevant information carried by the input messages and the output messages with the configured corresponding relationship information, comprising:

first, determine whether the messages through the Net Address Translation (NAT) Router are input messages or output messages, referring to step 2, wherein:

if the input messages, match the destination address, destination port, and protocol code carried by the messages with the external address, external port, and external protocol code in the mapping table of the internal server, referring to step 3, and determine whether there is a matched item in the mapping table of the internal server, referring to step 4, if yes, it indicates that the messages received are input messages, process to step 5; otherwise the messages will not be processed, referring to step 6. In addition, if there are not messages matching with the relevant information in the mapping table of the internal server, the messages can be handed over to other modules to process;

if they are output messages, match the source address, source port, and source protocol code with the internal address, internal port, and internal protocol code configured, referring to step 7, and determine whether there is a matched item in the mapping table of the internal server, referring to step 8, if yes, it indicates that the messages are output messages, process to step 9; otherwise the messages will not be processed, referring to step 6, and the messages can be handed over to other modules to process.

Last, process the messages correspondingly according to the matching result, wherein:

for the input messages, for the matched message, replace the destination address and destination port in the messages with the internal address and internal port corresponding to the external address and external port matching with the relevant information of the message in the mapping table of the internal server, referring to step 5, and then forward the message, thus, the internal server with an internal address can receive messages from outside correctly.

For the output messages, replace the source address and source port in the messages with the external address and external port corresponding to the internal address and internal port matching with the relevant information of the messages, referring to step 9, and then forward the message, thus, output messages can be forwarded normally.

According to the present invention, because that the valid public IP address acquired from an ISP is not bound to a private IP address of the internal network statically, other hosts in the network can also access Internet via said public IP address. At the same time, through configuring the mapping table of the internal server correctly, the ports providing exterior services of the internal server can be designated to guarantee security of the internal server. In conclusion, only messages matching with relevant information in the address mapping table can be exchanged between the internal server in internal network and external hosts, thus invalid access to internal server from external hosts are prohibited.

What is claimed is:

1. A method for providing an internal server with reduced IP addresses, comprising:
   (1) configuring corresponding relationship information between an external address, an external port, and an external protocol code of the internal server and an internal address, an internal port, and an internal protocol code of the internal server;
   (2) matching relevant information carried by a message exchanged between the internal network and Internet with the configured corresponding relationship information;
   (3) processing the message according to the matching result wherein the message exchanged between the internal network and the Internet enters an external Internet after being processed by a Net Address Translation (NAT) Router.

2. The method of claim 1, wherein said step (2) further comprises:

determining whether the message through the Net Address Translation (NAT) Router is an input message from outside or an output (upload) message to outside;

if the message is the input message, matching a destination address, a destination port, and a protocol code carried by the message with the external address, the external port, and the external protocol code configured; and if the message is the output message, matching a source address, a source port, and a source protocol code with the internal address, the internal port, and the internal protocol code configured.

3. The method of claim 2, wherein for the input message, said step (3) further comprises:

determining whether there is a matched item in the corresponding relationship information of the internal server;

if yes, replacing the destination address and the destination port in the message with the internal address and the internal port corresponding to the external address and the external port matching with the relevant information of the input message;

if no, no procession being done to the input message.

4. The method of claim 2, wherein for the output message, said step (3) further comprises:

determining whether there is a matched item in the corresponding relationship information of the internal server;

if yes, replacing the source address and the source port in the message with the external address and the external port corresponding to the internal address and the internal port matching with the relevant information of the output message;

if no, no procession being done to the output message.

* * * * *